(12) United States Patent
Hagenbuch

(10) Patent No.: US 7,901,009 B2
(45) Date of Patent: Mar. 8, 2011

(54) SEVERE APPLICATION OFF-HIGHWAY TRUCK BODY

(76) Inventor: LeRoy G. Hagenbuch, Peoria, IL (US)

( * ) Notice: Subject to any disclaimer, the term of this patent is extended or adjusted under 35 U.S.C. 154(b) by 1059 days.

(21) Appl. No.: 11/521,995

(22) Filed: Sep. 14, 2006

(65) Prior Publication Data

US 2008/0067856 A1 Mar. 20, 2008

(51) Int. Cl.
*B60P 1/16* (2006.01)
(52) U.S. Cl. ...... 298/23 D; 298/7; 298/22 R; 298/23 DF; 296/183.2
(58) Field of Classification Search ............... 298/1 B, 298/1 V, 7, 17 R, 22 R, 23 D, 23 DF; 296/183.2
See application file for complete search history.

(56) References Cited

U.S. PATENT DOCUMENTS

| | | |
|---|---|---|
| 2,324,749 A | 7/1943 | Wieden |
| 2,565,850 A | 8/1951 | Hyler et al. |
| 2,988,832 A | 6/1961 | Hancock et al. |
| 3,073,044 A | 1/1963 | Bernotas |
| 3,170,578 A | 2/1965 | Moreland |
| 3,252,600 A | 5/1966 | Brisson et al. |
| 3,256,778 A | 6/1966 | Fine |
| 3,465,458 A | 9/1969 | Wagner |
| 3,627,753 A | 12/1969 | Pitts |
| 3,576,161 A | 4/1971 | Wright |
| 3,584,403 A | 6/1971 | Copeland |
| 3,613,556 A | 10/1971 | Wright et al. |
| 3,675,347 A | 7/1972 | Stewart et al. |
| 3,682,333 A | 8/1972 | Krause |
| 3,734,316 A | 5/1973 | Worthington |
| 3,799,374 A | 3/1974 | Weaver |
| 3,841,505 A | 10/1974 | Kent |
| 3,888,366 A | 6/1975 | Prahst |
| 3,896,947 A | 7/1975 | Pearce |
| 3,901,394 A | 8/1975 | Bowles |
| 3,921,839 A | 11/1975 | Herpich |
| 3,931,687 A | 1/1976 | Johns, Jr. |

(Continued)

FOREIGN PATENT DOCUMENTS

EP 0 065 249 A1 11/1982

(Continued)

OTHER PUBLICATIONS

International Organization for Standardization, ISO 6483-1980 (E), "Earth Moving Machinery-Dumper Bodies-Volumetric Rating", Sep. 15, 1980.

(Continued)

*Primary Examiner* — Stephen Gordon
(74) *Attorney, Agent, or Firm* — Leydig, Voit & Mayer Ltd

(57) ABSTRACT

An open top body of an off-highway haulage vehicle is described for severe hauling applications such as hauling of high density, abrasive material. The body has a floor divided into at least two sections with first and second sections angled at different inclinations. The second section extends to the rear edge of the floor and is at an angle of inclination greater than the first section. The opposing sidewalls of the body extend vertically from the floor are flared or taper along their length such that the body floor is wider at the rear of the body than it is at the front. The body includes a tailgate pivotally attached to the sidewalls for rotation between closed and opened positions in response to the bumping of the load by the body.

8 Claims, 6 Drawing Sheets

U.S. PATENT DOCUMENTS

| | | | |
|---|---|---|---|
| 4,011,957 | A | 3/1977 | Bendtsen |
| 4,050,594 | A | 9/1977 | Gollnick |
| 4,057,010 | A | 11/1977 | Smith |
| 4,094,424 | A | 6/1978 | Harvey et al. |
| 4,190,265 | A | 2/1980 | Goodbary et al. |
| 4,197,049 | A | 4/1980 | Stedman et al. |
| 4,264,261 | A | 4/1981 | Brisson |
| 4,273,497 | A | 6/1981 | Mealing et al. |
| 4,453,879 | A | 6/1984 | Kelley et al. |
| 4,522,551 | A | 6/1985 | Henneberry |
| 4,614,477 | A | 9/1986 | Hagenbuch |
| 4,648,775 | A | 3/1987 | Verner |
| 4,678,235 | A | 7/1987 | Hagenbuch |
| 4,684,152 | A | 8/1987 | Goodbary et al. |
| 4,691,792 | A | 9/1987 | Shintani |
| 4,813,004 | A | 3/1989 | Fujika et al. |
| 4,953,109 | A | 8/1990 | Burgis |
| 5,259,322 | A | 11/1993 | Dominguez et al. |
| 5,352,084 | A | 10/1994 | Hodgins |
| 5,404,661 | A | 4/1995 | Sahm et al. |
| 5,456,521 | A | 10/1995 | Moyna |
| 5,474,363 | A | 12/1995 | Hagenbuch |
| 5,531,122 | A | 7/1996 | Chatham et al. |
| 5,650,930 | A | 7/1997 | Hagenbcuh |
| 5,681,095 | A * | 10/1997 | Martin .................. 298/22 R |
| 5,815,960 | A | 10/1998 | Soczka |
| 5,816,766 | A | 10/1998 | Clark |
| 5,844,564 | A | 12/1998 | Bennis et al. |
| 5,857,825 | A | 1/1999 | Rice |
| 5,885,049 | A | 3/1999 | McNeilus et al. |
| 5,887,914 | A | 3/1999 | Hagenbuch |
| 5,936,869 | A | 8/1999 | Sakaguchi et al. |
| 6,022,068 | A | 2/2000 | D'Amico |
| 6,062,803 | A | 5/2000 | Christenson et al. |
| 6,062,804 | A | 5/2000 | Young et al. |
| 6,079,933 | A | 6/2000 | Moyna et al. |
| 6,092,973 | A | 7/2000 | Burnett et al. |
| 6,102,644 | A | 8/2000 | Young et al. |
| 6,106,072 | A | 8/2000 | Lutter, Jr. |
| 6,155,776 | A | 12/2000 | Moyna |
| 6,157,889 | A | 12/2000 | Baker |
| 6,176,672 | B1 | 1/2001 | Egan et al. |
| 6,238,167 | B1 | 5/2001 | Kenny et al. |
| 6,313,414 | B1 | 11/2001 | Campbell |
| 6,374,201 | B1 | 4/2002 | Grizon et al. |
| 6,561,747 | B2 | 5/2003 | Kenny et al. |
| 6,672,822 | B1 | 1/2004 | Moyna |
| 6,719,349 | B2 | 4/2004 | Moyna |
| 6,769,859 | B2 | 8/2004 | Moyna |
| 6,869,250 | B2 | 3/2005 | Moyna |
| 7,369,978 | B1 | 5/2008 | Hagenbuch et al. |
| 7,412,357 | B1 | 8/2008 | Hagenbuch et al. |
| 2003/0019642 | A1 | 1/2003 | Moyna |
| 2003/0088340 | A1 | 5/2003 | Hagenbuch |
| 2003/0170101 | A1 | 9/2003 | Moyna |
| 2003/0223849 | A1 | 12/2003 | Hagenbuch |
| 2004/0032141 | A1 | 2/2004 | Moyna |
| 2004/0146356 | A1 | 7/2004 | Moyna |
| 2004/0188115 | A1 | 9/2004 | Moyna et al. |

FOREIGN PATENT DOCUMENTS

| | | |
|---|---|---|
| NL | 7207311 | 6/1973 |
| WO | WO 00/76805 A1 | 12/2000 |

OTHER PUBLICATIONS

Society of Automotive Engineers, Inc., SAE Construction, Agricultural and Off-Road Machinery Standards Manual HS-2800, "Capacity Rating-Dumper Body and Trailer Body", Jan. 1985, p. 380-381.

Caterpillar Inc., Product Division, Field Representative Information Release, N149F, "769 Series B Truck", Aug. 24, 1966, p. 1-21.

Caterpillar Inc., Brochure AE026730 "Caterpillar 769 Series B", Applicants believe available in 1967.

Caterpillar Inc., Brochure AEHQ5186 "Caterpillar 793C Mining Truck", Copyright 1996.

Euclid Inc., Form 12-015 Euclid R-85 Specifications, Aug. 1977.

Euclid Inc., Form 12-028 "Euclid R-85 Hauler Specifications", Sep. 1985.

VME Americas Inc., Form RH-483 "Euclid R-85 B", Jan. 1991.

Euclid Inc., From RH-483 R1 "Euclid R85B Haul Units", Aug. 1994.

Duff, Elliot "*Automated Volume Measurement of Haul-Truck Loads*", CSIRO Manufacturing Science and Technology, Presented at Open Coal Cut Operations Conference, Mackay, Queensland, Jun. 16, 2000.

"New Technology to Measure Mining Haul Truck Loads," CSIRO Press Release Jul. 1, 2003.

"Capacity Rating—Dumper Body and Trailer Body—SAE J1363 Nov. 1995," 1999 *SAE Handbook-Volume 3 On-Highway Vehicles and Off-Highway Machinery, Society of Automotive Engineers, Inc.*

"Earth-Moving Machinery-Dumper Bodies-Volumetric Rating," *International Standard ISO 6483*; 1980, pp. 1-5.

"Komatsu Price Changes," *Equipment Watch Price Alert*, Aug. 2002.

Komatsu 930E-2 truck spec sheet, Jun. 2002.

"Caterpillar Price Changes," *Equipment Watch Price Alert*, Jan. 2003.

Caterpillar 777D Off-Highway Truck, spec sheet, Jun. 2000.

"Mining Lifts Goldfields Crane Hire," *Australia Mining Monthly*; Dec. 2002, p. 67.

"Detroit Diesel-We'll Move Mountains for You," *Australia Mining Monthly*; Aug. 2003.

"Trucks & Shovels," *World Mining Equipment*; Sep. 2003, vol. 27, No. 7 (including Komatsu PC 3000 ad and truck/shovel loading photos).

*North American Quarry News*, 2003-DBT Mineral Processing ad.

*Mining Engineer*, front cover; May 2003.

"P&H 2800 XP Shovel," *Perspective in Mining*, vol. 7, No. 2, p. 4.

"Excavator Selection," *Peak & Performance Practices*, front cover.

"Angles of Repose (Heap)"; Chart, Philippi-Hagenbuch, Inc. 2003.

Oner, Mete, "Deep Dark Secrets of Geotechnical Engineering," *EJGE/Magazine*, internet article 1997; p. 1-4.

"B.2.60 Angle of Repose," web page from *Michigan State University Department of Physics and Astronomy Lecture Demonstrations Databases*, downloaded Sep. 28, 2003.

"Angle of Repose," web page from *Michigan Tech University*, downloaded Sep. 28, 2003.

"Angle of Repose," web page from NCSU Physics DemoRoom, downloaded Sep. 28, 2003.

"Angle of Repose and Angle of Marginal Stability," web page from http://www.hlrs.de/people/mueller/papers/parallelMD99/node3. html, downloaded Sep. 28, 2003.

"Angle of Repose," web page from www.HyperDictionary.com, downloaded Sep. 28, 2003.

"Angle of Repose," web page from *University of Texas at Austin Physics Department*, downloaded Sep. 28, 2003.

Faris, Roger, "Find Your Safe Angle of Repose," internet article from *The Seattle Press*, downloaded Sep. 28, 2003.

"Mass Wasting and the Angle of Repose," internet article from http://phoenix.liuent.edu/~divernere/notes/angle_of_repose.htm; p. 1-3, downloaded Sep. 28, 2003.

Angle of Repose diagram from Brunner Mond, undated.

"Angle of Repose," charts from web page http://www.geol.umd.edu/~ kaufman/ppt/chapter8/sld006.htm; p. 1-2, downloaded Oct. 4, 2003.

Lee, J. et al., "Angle of Repose and Angle of Marginal Stability: Molecular Dynamics of Granular Particles," abstract article from www.IOP.org/EJ/abstract/0305-4470/26/2/01; p. 1-2, Jan. 21, 1993.

"Angle of Repose," web page from www.RCRC.nm.org/glossary/gl-angle-of-repose.html, downloaded Sep. 28, 2003.

Olson, C.J. et al., "Effect of Grain Geometry on Angle of Repose and Dynamics," internet article from www.eps.org/aps/meet/MAR01/baps/abs/S338005.html, downloaded Sep. 28, 2003.

"Effect of Water on the Angle of Repose," slide 2 of 35 from internet site www.ideo.columbia.edu/dees/ees/ies2/masswasting/sld002.html, downloaded Sep. 28, 2003.

"Dynamics Angles of Repose," internet article from http://groups.physics.umn.edu/sand/theory.shtml; p. 1-2, downloaded Sep. 28, 2003.

Morisawa, Marie, "Stable Angles of Slopes," from www.beloit.edu/~SEPM/EArth_Works/Stable_angles_of_slopes.html; pp. 1-4, downloaded Sep. 28, 2003.

Park, Brien, "What do you suppose is the "angle of repose"?," web article from www.nps.gov/brca/Geodetect/Earth%20Systems/angle%20of%20repose.htm; pp. 1-4. Jul. 9, 2002.

"Sand Angels," web article from www.edgerton.org/kidscorner/sandangels.html; pp. 1-2, downloaded Sep. 28, 2003.

Excerpt from "Highways in the River Environment," p. 1-4; 1975.

"Sand Piles," web page from http://van.hep.uiuc.edu/van/qa/section/Everything_Else/Hard_to_Categorize/924816567.htm, downloaded Sep. 28, 2003.

"Slope Stability Lab," web page from www.geo.arizona.edu/K-12/azpepp/education/activity/la.html; p. 1-4, downloaded Sep. 28, 2003.

"The Angle of Repose and the Static Coefficient of Friction," web page from www.redcompservices.com/Pcourses/Phys1/repose.htm; p. 1-2, downloaded Sep. 28, 2003.

Prompalagorn, Wiroj et al., "Priction Coefficient & Angle of Repose Equipments," web abstract from http://library.kmitnb.ac.th/projects/eng/MHT/mht0096e.html, 1996.

"Slope Stability Lab," pp. 1-4 (undated).

"Angle of Repose," slide 3 of presentation, http://www3.uakron.edu/geography/lrb/physf97/lectures/masswaste/sld003.htm, downloaded Sep. 28, 2003.

Chase, George G., "Solids Notes," University of Akron (undated), pp. 4-1 and 4-2.

"Mass Wasting," (undated); pp. 1-7.

"CHASM: Cone Handling Algorithms for Stockpile Modeling," web article from www.cmis.csiro.au/PPI/RecentProjects/CHASM.htm; pp. 1-3, downloaded Sep. 28, 2003.

"Axial Segregation in Binary Granular Flows," abstract from www.aae.uiuc.edu/floatn/C%20PROJ/pp02-03f.htm; pp. 1-2, downloaded Sep. 28, 2003.

Bulk-Store Structures Inc. internet brochure from www.bulk-store.ca/fert.html; pp. 1-3; 2000.

Commercial Hopper Tank Storage Capacities and Heights spec sheet; 2002.

"Volcanism Behind the Main Arc," web page from www.rci.rutgers.edu/~carr/fieldtrip/fieldtext/cuilapa_fldtxt.htm, downloaded Sep. 28, 2003.

"Screening Equipment," SMICO Manufacturing web page www.smico.com, downloaded Oct. 1, 2003.

"Material Bulk Density Reference Chart," SMICO Manufacturing; pp. 1-20 (undated).

Hudson, Ralph G., *The Engineers' Manual*; Second Edition 1963; pp. 101-102.

"Storage of Farm Crops," *Agricultural Engineers' Handbook*; pp. 691, 1961.

"Approximate Angle of Repose of Various Materials," *Caterpillar Performance Handbook*;, p. 25; Jan. 1972.

"Tables-Angle of Repose of Various Materials," *Caterpillar Performance Handbook*, pp. 26-31; Oct. 2002.

"Material Angles of Repose," chart from Philippi-Hagenbuch, Inc., 2003.

"Density of Common Materials," *The Excavators 5th Edition-Hitachi*; sections 11-36:11-39 (undated).

"Tables: Weight of Materials," *Caterpillar Performance Handbook Edition 33*, Oct. 2002.

Caterpillar General Dimensions 769B Truck (undated).

Caterpillar Body Assembly 769B Truck (undated).

Sideview drawing showing Ten Different Load Configurations-Load Heaps for the Caterpillar 769B Body, created by Philippi-Hagenbuch, 2003.

"Four "A" Size Isometric Drawings displaying one each possible 1.7:1 load configuration-load heap," for the Caterpillar 769B Truck; created by Philippi-Hagenbuch, 2003; Doc. FS1 1.7:1 Heap (1:1 at rear) 30.2 cu yd; Doc. FS2 1.7:1 (True Heap) 27.5 cu yd; Doc. FS3 1.7:1 Profiled Heap (to a point) 26.0 cu yd; and Doc. FS4 1.7:1 Profiled Heap (with top plateau) 25.8 cu yd.

"3M Mining" advertisement in *Mining Monthly*; Aug. 2003.

CSIRO-Common Wealth Scientific & Industrial Research Organization of Australia; website home page, downloaded Oct. 5, 2003.

"A Proud History," *Euclid Haulers* brochure; 1988.

"2:1 Heap," *Euclid-Hitachi* brochure; 1995.

"2:1 SAE Heap," *Euclid-Hitachi* brochure; 1999.

"2:1 SAE—Euclid R130," *VME Americas Inc.*; 1989.

"2:1 SAE—Euclid R190," *VME Americas Inc.*; 1990.

"2:1 SAE—Euclid R25," *Euclid Inc.*; 1982.

"2:1 Field Heap—Euclid R35," *Euclid Inc.*; 1983.

"SAE 2:1 Rated Heap," *VME Industries North America*; 1992.

Caterpillar D400E Series II Ejector full brochure, 18 pages total (1999, 2000).

Printout of the Caterpillar 740 Ejector Articulated Truck website page "Performance and productivity", retrieved from http://cmms.cat.com/cmms/servlet/cat.dcs.cmms.servlet.GetSalesFeaturesFullServlet?ds fF1 on Jul. 11, 2005 (2 pages).

The Multidrive M8-35 Multi-Load Ejector brochure—*The New Generation ADT*—"Low Operating Costs Maximum Operating Advantages", 16 pages, (2003).

Multidrive M8-40 High Speed Ejector-Hauler Brochure—*Technical Specification—Multidrive*, 6 pages total (2003).

Information sheet from Sure Alloy Steel Corporation entitled "SA1750-CR Out Performs Its Competition Once Again" (2005) (1 page).

Printout from Sure Alloy News entitled "SA1750-CR Out Performs the Competition Once Again!" retrieved from http://surealloy.com/news_details.asp?aid=20 on Jul. 6, 2005 (2 pages).

Printout entitled "Overlay Products" from the Trimay Wear Plate Ltd. website http://www.trimay.ca/overlay.shtml on Jul. 6, 2005 (3 pages).

Printout entitled "Trimay Wear Resistant Overlay Steel Plate—Range Summary" from the Trimay Wear Plate Ltd. website http://www.tritenapg.com/product4.html on Jul. 6, 2005 (2 pages).

Article taken from Grading and Excavation Contractor/Articulated Dump Trucks entitled "*Articulated Dump Trucks: The Arnold Schwartzenegger of Trucks*" at http://www.forester.net/gx_0207_articulated.html on Dec. 14, 2005 (10 pages).

Article taken from Economic Development: Iowa State University—*Helping Iowa and Iowans become their best*—"Success Stories—Examples of ISU assistance to business/industry", http://www.iastate.edu/bus/econdev/success.shtml entitled 'Example of ISU assistance to business/industry o n May 9, 2005 (1 page).

Article entitled "*Welcome to E-Ject System, L.C.—The Leader in World-Class Earthmoving Equipment*", retrieved from http://www.ejectsystems.com on Dec. 14, 2005 (3 pages).

Fesak, George M., et al., "Analysis of Surface Powered Haulage Accidents Jan. 1990 to Jul. 1996", *HAS Bulletin* Reprint Sep. 1996.

Stentz, Anthony, et al., "A Robotic Excavator for Autonomous Truck Loading", *Autonomous Robots 7*, 175-186 (1999).

Liffman, Kurt, et al., "Stress In Sandpiles", Second International Conference on CFD in the Minerals and Process Industries *CSIRO*, Melbourne, Australia (Dec. 6-8, 1999).

Singh, Sanjiv, "The State of the Art in Automation of Earthmoving", In ASCE Journal of Aerospace Engineering, vol. 10(4) (Oct. 1997).

Bucher Hydraulics, Valve Block for Compacting Container, Product Data Sheet, undated (available to applicant around Nov. 2002).

Photo (8) of Reynolds RE-30 Trailer/Rear Ejector Wagon taken during Mar. 1999 ConExpo/ConAgg Show.

Alloy Steel International: Arcoplate Product Brochure, undated (available to applicant prior to Feb. 25, 2002).

International Search Report (Feb. 13, 2004).

Stulz Sickess Company, www.stulzsicklesteel.com, Producers of Manganal Steel Products and Welding Electrodes for Resistance to Wear—Material Safety, pp. 1-5.

Stulz Sickess Company, www.stulzsicklesteel.com, Producers of Manganal Steel Products and Welding Electrodes for Resistance to Wear—Products, pp. 1-18.

Alloy Steel International, www.alloysteel.net., The King of all Wear Resistant Products, 1 page.

Alloy Steel International, www.alloysteel.net, Technical Edge—Company News, Arcoplate Distribution Agreement, (Feb. 26, 2003), p. 1.

Alloy Steel International, www.alloysteel.net, Technical Edge—Media Releases, Van de Grijp sets wear-resistant standard, (May 21, 2002), p. 1.

Alloy Steel International, www.alloysteel.net, Technical Library—Arcoplate Grades, Arcoplate Alloy and Base Thickness, pp. 1-2.

Alloy Steel International, www.alloysteel.net, Technical Library—Wear Graphics, p. 1.

Caterpillar, "*Mine Specific Design (MSD) Body Program*". from CD distributed Oct. 2000 at Mine Expo 2000.

Conymet, "*Photometry Software Tool for Volumetric and Load Distribution Study*", downloaded from www.conymet.com; Nov. 26, 2002.

Conymet, "*High Efficiency Body (HE Series)*", from presentation given May 2002 at Haulage 2002 Conference.

Disca. "*DT-HILOAD Haulage 2002*", from presentation given May 2002 at Haulage 2002 Conference.

Angles of Repose Diagrams, updated (created after filing date of present application).

Caterpillar 769B Truck product brochure; Aug. 1966.

Selected charts and diagrams from a Philippi-Hagenbuch, Inc. Presentation undated (created after filing date of present application).

Hagenbuch, LeRoy G., *SME Preprint 02-137* entitled "*Off-Highway Truck Body True Capacity . . . Why Can't I Get Rated Payload on My Off-Highway Truck Without Hungry Boards and Tail Extensions*".

Hagenbuch, LeRoy G. "*Adapting the Off-Highway Truck Body Volumetric Process to Real World Conditions*", SAE Technical Paper Series, 2000; undated.

Photograph from Caterpillar brochures featuring: 785 Truck (Apr. 1988) -AEHQ7006 (undated).

Photograph from Caterpillar brochures featuring 785C Mining Truck (Apr. 2002)-AEHQ5328-02 (undated).

Photograph from Caterpillar brochures featuring 773E Truck (Nov. 2001)-AEHQ5456 (undated).

Photograph from Caterpillar brochures featuring 775E Truck (Nov. 2001)-AEHQ5457 (undated).

Photograph from Caterpillar brochures featuring 785/789 Truck (AEDK1468) (undated).

Photograph from Caterpillar brochures featuring 775B Truck (Apr. 1994)-AEHQ3874 (undated).

Caterpillar 769B Truck product brochure, Mar. 1974.

"*New Technology to Measure Mining Haul Truck Loads*," article from http:www.cmit.cisro.au/innovation/2003.08; p. 1-2. downloaded Aug. 22, 2003.

Caterpillar 769B Truck product brochure specification, undated (applicants believe available in the late 1960's to 1970's)—This brochure was cited in the following related cases U.S. Appl. Nos. 09/333,379; 09/593,647 and 10/286,095, at this time applicant is unable to locate this brochure for the examiner.

* cited by examiner

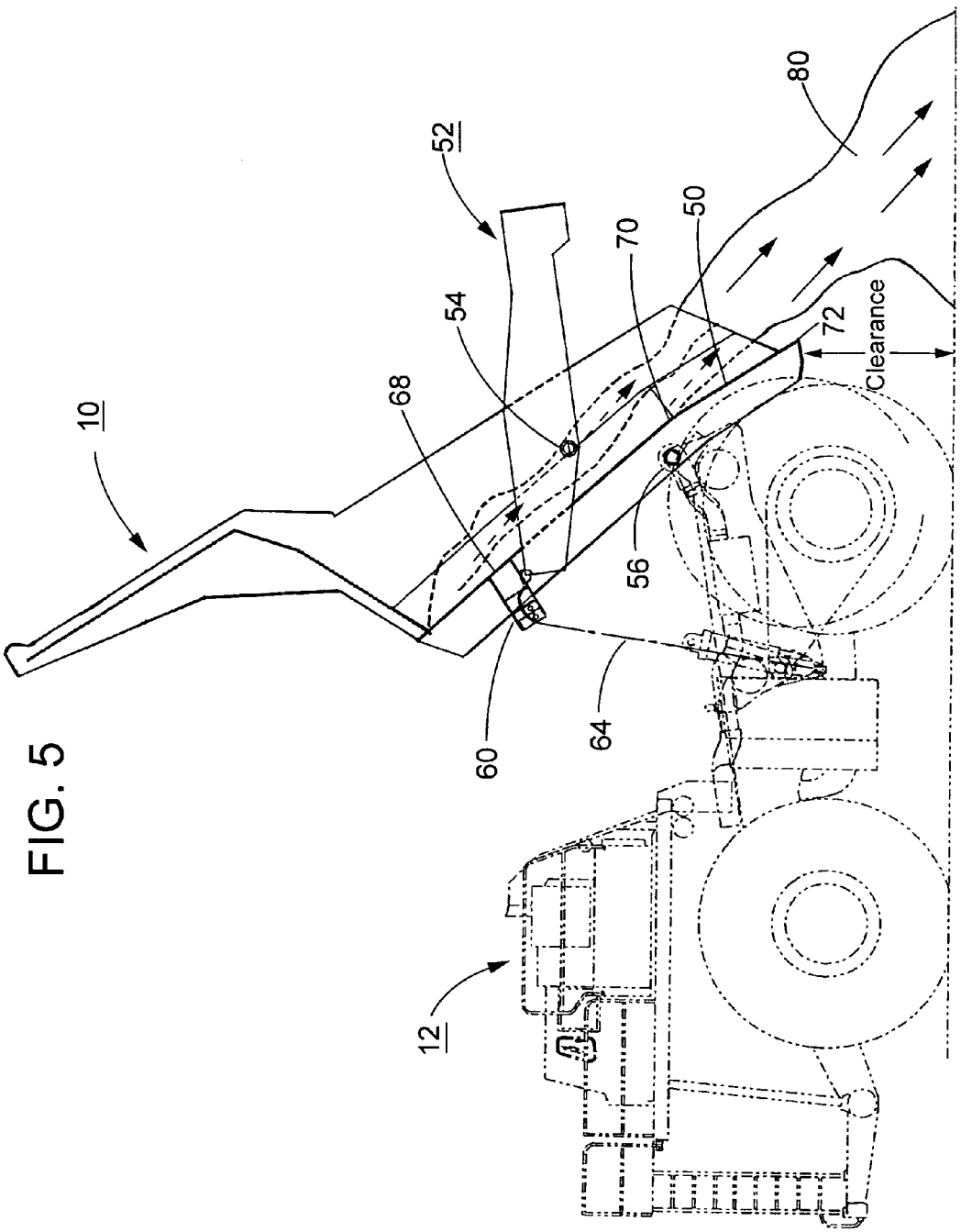

SEVERE APPLICATION OFF-HIGHWAY TRUCK BODY

This patent application is related to U.S. patent application Ser. No. 9/593,647, filed Jun. 13, 2000 (Now U.S. Pat. No. 7,369,978, issued on May 6, 2008), Ser. No. 09/333,379, filed Jun. 15, 1999 (Now U.S. Pat. No. 7,412,357, issued on Aug. 12, 2008), Ser. No. 10/286,095, filed Nov. 1, 2002 (Now U.S. Pat. No. 7,257,467, issued on Aug. 14, 2007) and Ser. No. 10/374,803, filed Feb. 25, 2003 (Now U.S. Pat. No. 7,326,023, issued on Feb. 5, 2008), each of which is incorporated by reference in its entirety for everything it describes.

BACKGROUND OF THE INVENTION

In mining and construction environments, heavy-duty off-highway trucks are used to haul a variety of materials such as, for example, coal, rock, ore, overburden materials. Some environments expose the trucks to severe hauling conditions in which the material being hauled is relatively dense (e.g., 2700+ lbs./cubic yard) such as heavy metal ores (e.g., iron, gold and copper ore) and oil sands such as those mined in northern Canada. These types of materials can be extremely abrasive and cause severe wear on the inside of the bodies, particularly the floor area and particularly on the rear portion of the floor were the most material flows over the floor, thereby causing the most extreme floor wear. Moreover, material like the oil sands tend to be extremely cohesive and dump as one homogenous mass or glob of material (e.g., often called a "loaf" in the industry) that does not flake off or otherwise break apart and tumble as it is dumped. As used herein, the phrase "abrasive material" is material often high in silica and or material tending to be angular in composition and containing components such as silica having a hardness (e.g., MOHS value, Vickers Pyramid Number) greater than that of the material comprising the body hauling the material.

Typically, the sidewalls of a truck body are parallel to one another. For extremely abrasive materials, the bodies are sometimes made so the sidewalls are not parallel and instead taper away from one another from the front to the back of the body. By having the body sidewalls farther apart at the back of the body than at the front, as material is dumped from the body the material is relieved outwardly by the widening distance between the sidewalls as the material flows from the body. Looking from the rear of the body, the body sidewalls appear to funnel inwardly toward the front.

Bodies exposed to these severe applications are found primarily on very large capacity off-highway, haulage trucks such as those that have a payload of about 100 tons up to 400 tons and more. These trucks are typically equipped with open ended bodies—i.e., without tailgates. The rear of the truck body is open for easy material discharge and to ease the body loading process with loading shovel bucket's swinging in through the rear of the truck body.

As material is dumped from a truck body, it flows from the front of the body toward the back. As a natural result of this flow, the rearward portion of the body experiences more material moving over its surface than does the forward portion of the body and thus the most wear from any abrasion caused by the material flow. For hauling and dumping less abrasive material such as coal, the length of the hauling vehicle's body is not a serious problem with respect to the extra wear experienced toward the rear of the body's floor compared to the wear at the forward portion of the body. However, for material that is relatively highly abrasive, the disproportionate wearing of the rearward portion of the body is extreme and creates on going maintenance problems that significantly shorten the useful life of the body. And if, the body does not have a tailgate, its length is proportionally longer than necessary for statically supporting the load. This body length is necessary to carry the required load and to minimize the amount of material spilling out the open ended rear of the body as the truck travels along a haulage road. Such haulage roads are all part of a mine or construction project and are on private property and unsuitable for any public transport or transit.

Spillage of material on these privately operated haulage roads can be extremely costly. Spilt material often has sharp edges. Damage to the tires of the trucks traveling on the haulage route is likely to occur as the trucks drive over such spilled material. The spilled material may cut into the tires, substantially diminishing the tire life. Tires for large off-highway truck haulage vehicles often cost in excess of $20,000 to $40,000 per tire. As such, the tires of the vehicles represent a substantial investment that must be properly maintained and protected for maximum tire life. Good tire life on off-highway truck haulage vehicles approaches 8,000 and sometimes as much as 10,000 operating hours. In operations where there are large amounts of spilled material on the haulage roads, the operating hours per tire may drop as low as 1,000 to 2,000 hours per tire, which dramatically increases material haulage costs.

For trucks bodies without tailgates, the floor is typically angled upwardly at the rear of the body in order to assist in retaining the loaded material in the body (i.e., often a "V" shaped profile of the body when viewed from the side). In some bodies the loaded material retaining ability of the body is enhanced by "duck tailing" the rear portion of the body, which means that the body floor angle changes to a higher inclination angle at the rearward portion of the body in order to make it more difficult for material to spill as it is transported. Typically a "duck tailed" body has the last $\frac{1}{3}$ to $\frac{1}{5}$ portion of the body floor at such an angle to improve the body's ability load retention.

In low density material applications, these open-ended bodies are sometimes fitted with tailgates as a means to increase their volumetric loading capacity. For low density mined material such as coal, tailgates allow these very large trucks to carry greater volumes than otherwise possible without the tailgates. And to further increase the volume, the inclination of the rear of the floor is lowered. The higher volume of material does not overload the truck because it is of relatively low density such that the total weight of the load is within the limits specified for the truck chassis. An example of a body for an off-highway haulage vehicle with a tailgate is shown in applicant's U.S. Pat. No. 4,678,235, which is hereby incorporated by reference in its entirety for everything it describes. The tailgate does tend to raise the vertical elevation of the rear edge of the body over which a shovel bucket must clear the rear of the body as it swings a loaded bucket into the body for dumping into the body.

BRIEF SUMMARY OF THE INVENTION

A body for handling highly abrasive material is designed to minimize the wear on the rearward area of the body during the dumping of a load from the body. The floor length of the body's extension rearward is truncated and lowered with respect to conventional bodies that use the length of the body's floor to inhibit material spillage. But, the body floor length can only be shortened and lowered if the body still hauls the amount of material required to reach the rated payload of the truck chassis and material spillage is minimized. Instead of relying on the length of the floor for controlling material spillage, the body incorporates a tailgate. With the addition of a tailgate to the rear of the body, the body floor can be shortened and lowered and the rated payload can still be carried. Those skilled in the art of designing dump bodies for large, off-highway trucks will appreciate that the addition of a tailgate to a body intended for hauling dense material, which is what abrasive material often is, is contrary to conventional practice. In the invention, however, the tailgate cooperates with other aspects of the invention to provide a dump body that hauls and dumps abrasive material with less wear than that experienced by conventional dump bodies without tailgates.

To reduce the wear on the floor at the rearward portion of the body, the floor is angled downwardly with respect to the angle of the forward area of the floor. By angling the floor downwardly at its rearward portion, the frictional force of the abrasive material as it flows from the body during the dumping of a load is lessened. In a body whose rear portion of the floor is tipped downwardly with respect to the front of the floor, material flows from the body and over a point where the floor breaks away from one plane to another. As the material flows out the rear of the body, the trajectory of the material is influenced by the inclination of the forward part of the body where the forward floor section has a different angle than the rearward portion of the floor. The trajectory of the material tends to cause the material to overshoot the rearward area of the shortened floor and free fall, thereby reducing abrasion to that area of the floor. Moreover, the increased downward inclination of the rear floor section encourages the material as it flows from the body to tumble instead of sliding, which further decreases the abrasive wear on the floor.

Additionally, by shortening the body's floor, at full tilt of the body, the ground clearance of the rear of the body to ground is substantially increased. By increasing the ground clearance, there is less damage to the rear body edge from dumping the body into material already on the ground. Furthermore, where material is being dumped over an embankment, some areas require by regulation that a "dump berm" is at least as high as half the height of the largest tire operating in the haulage vehicle fleet in order to avoid accidentally backing the truck over the embankment. With conventional "V-shaped" or "duck tailed" bodies, this safety "dump berm" is continually being dumped into, destroying the dump berm and requiring it to be continually maintained with a piece of dozing equipment. With a body whose floor length is shortened, the dumping of the rear of the body into the safety dump berm is either stopped or minimized.

To still further reduce the wear of the body from hauling and dumping abrasive material, the sidewalls of the body are flared outwardly from the front to the rear of the body. The flared sidewalls provide an opportunity for the material to flow laterally as it is dumped, which relieves the amount of friction experienced by the sidewalls. With the sides and bottom of the load not fully supported as the material flows from the dump body, the load tends to disintegrate as it flows from the body (e.g., distributes more evenly and breaks up in free fall), particularly for cohesive materials that otherwise may tend to remain as a monolithic mass as they are dumped.

Hauling material that is extremely cohesive, such as the oil sands of Northern Alberta, Canada is an example of a severe haulage application for which the body of the invention is particularly appropriate. These oil sands when hauled and dumped from a truck body typically tend to dump as a single homogeneous mass, or glob, commonly referred to in the industry as a "loaf." A haulage vehicle incorporating the dump body of the invention has a floor that drops away and body sidewalls that outwardly taper away from the trajectory of the loaf as it is being dumped from the body, which encourages the unsupported material to free fall and break up as it moves out of the body. Though cohesive, the loaf will separate and tend to tumble and flow in smaller granulations of the material rather than dumping from the body as a substantially single mass that grinds against the rear floor area and sidewalls of the dump body. In contrast, conventional bodies tend to underpin the loaf being dumped over the full length of the truck body, encouraging the cohesive material to exit the dump body as a homogeneous mass.

The body is designed in keeping with the process and method described in co-pending U.S. patent applications Ser. No. 09/593,647, filed Jun. 13, 2000, Ser. No. 09/333,379, filed Jun. 15, 1999 and Ser. No. 10/286,095, filed Nov. 1, 2002. In these applications, the load carried by the body is modeled in three dimensions and then the body is designed to accommodate the shape of the load. The body may be of several different types such as a dump body or a rear eject body. An example of a rear eject body is shown in applicant's co-pending U.S. patent application Ser. No. 10/374,803, filed Feb. 25, 2003.

BRIEF DESCRIPTION OF THE SEVERAL VIEWS OF THE DRAWINGS

FIG. 5 illustrates the body of FIGS. 1-4 in a full tilt position, showing material flowing from the body over the rearward area of the body's floor and showing the clearance of the body from the ground.

Figure 1:
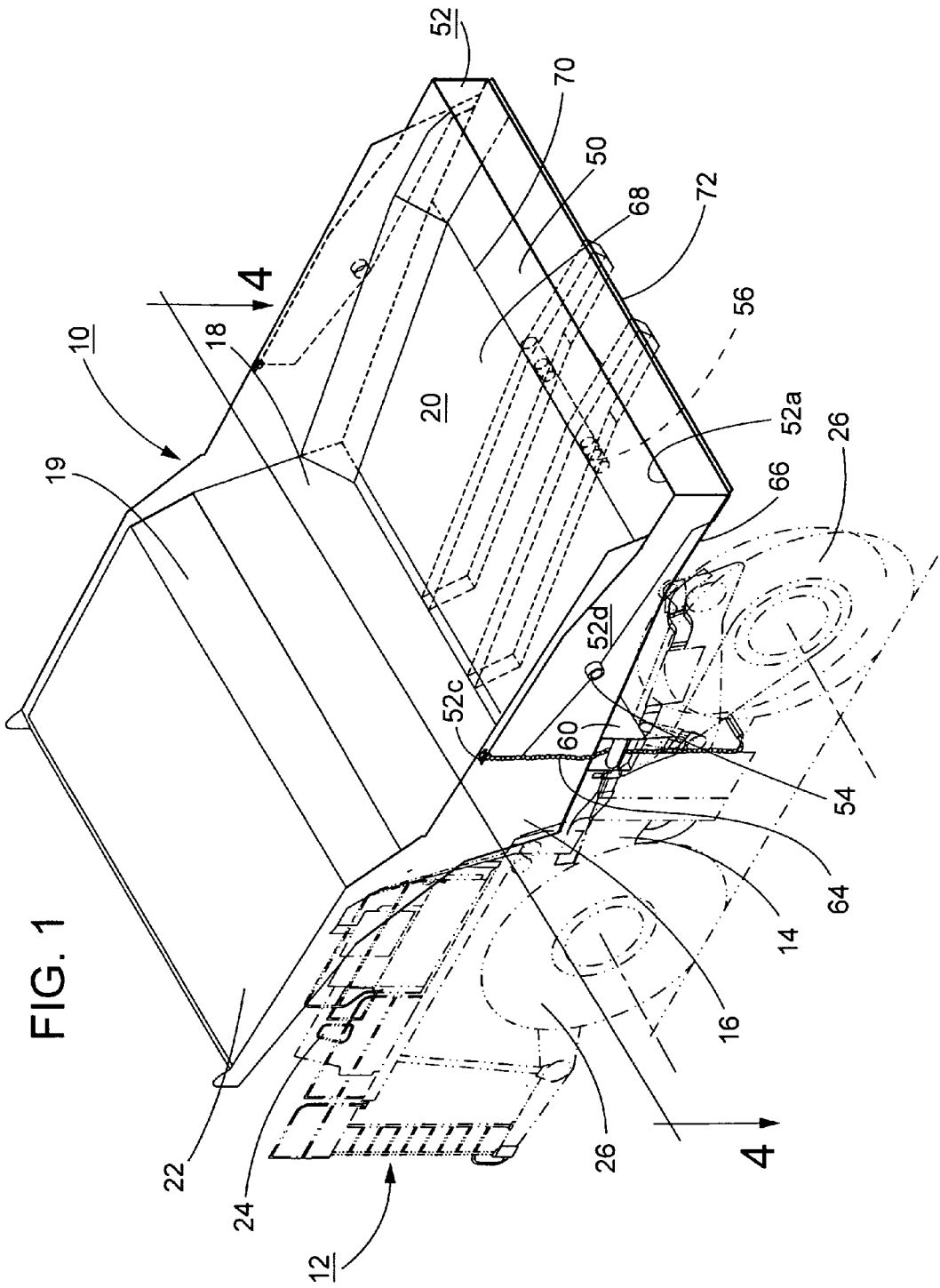
FIG. 1 is a perspective view of an off-highway haulage vehicle incorporating a body according to one embodiment of the invention.

While the invention will be described and disclosed in connection with a certain preferred embodiment illustrated in the drawings, it is not intended to limit the invention to the specific embodiment. Rather it is intended to cover all alternative embodiments and modifications falling within the spirit and scope of the invention as described herein.

DETAILED DESCRIPTION OF THE INVENTION

Referring now more particularly to the drawings there is shown in FIGS. 1-5 a dump body 10 for a heavy-duty off-highway truck 12 whose general design is in keeping with the three-dimensional modeling of a load for the body and the dimensioning of the body to accommodate that load as described in co-pending U.S. patent application Ser. No. 09/593,647, filed Jun. 13, 2000 and U.S. patent application Ser. No. 09/333,379, filed Jun. 15, 1999. Both of these applications have been incorporated by reference into this application for everything they describe.

The truck 12 includes a chassis 14 to which the dump body 10 is attached for pivotal movement about an axis 56 between a lowered position for receiving and transporting a load of material (FIGS. 1 and 3) and a raised position for dumping a load of material (FIG. 5). As shown in FIG. 1, the dump body 10 is generally constructed of steel panels that define the shape of the dump body and beams that form the structural framework for the dump body. The dump body comprises sidewalls 16, a front wall or front slope 18, a floor 20 and a canopy 22 integrally connected to the top end of the front slope 18 and extending over the cab 24 of the truck 12. The truck chassis 14 is supported by a plurality of tires 26.

For ease of illustration, only the body 10 is illustrated in its full three dimensions. The truck 12 is shown in two dimensions only. However, a three dimensional illustration of the truck can be seen in other patents such as applicant's above-identified U.S. Pat. No. 4,678,235. In the illustrated embodiment, the truck 12 is generally symmetrical about its longitudinal axis. Accordingly, as will be appreciated by those skilled in the art of off-highway haulage vehicles, many of the elements identified in the views of the drawing figures have complementary or mirror image elements arranged on the opposite side of the truck 12. As will also be appreciated by those skilled in the art, reference to plural elements where only one is shown in the drawings indicates that a complementary element is disposed on the side of the truck 12 not shown (e.g., tires 26).

In keeping with the design approach described in the co-pending U.S. patent application Ser. Nos. 09/593,647 and 09/333,379, the dump body 10 is designed so that the volumetric capacity of the body matches the truck's hauling capacity and loads in the dump body have a centers of gravity that best match the intended load center of gravity and corresponding load distribution contemplated by the design of the truck chassis 14. More specifically, the dump body 10 is shaped and dimensioned to accommodate the correct volumetric load as well as to maintain a weight distribution of the load that results in the load's center of gravity being proximate a predetermined location. In the illustrated embodiment, the preferred position for the load's center of gravity is based on a location assumed by the truck manufacturer in designing the chassis for supporting the load. For illustration, the preferred position is illustrated as vertical line 17 in FIG. 3. The actual center of gravity of the load should be positioned along the vertical line 17. Preferably, the load's center of gravity is as low as possible on the line 17.

The method of designing the body 10 utilizes a load profile that is based on a detailed analysis of the actual material characteristics and loading conditions present in field haulage environments, thereby taking into account factors such as the cohesiveness of the material to be hauled and the size, shape and gradation of the pieces of material and the material's abrasiveness. The details of the method for designing the body so as to take into account the heaping characteristics of the material actually being hauled is described in detail in the incorporated by reference, co-pending patent applications referenced above.

In accordance with an important aspect of the invention, the design of the body 10 is in keeping with the load modeling approach of the above-identified co-pending applications and further provides for design features that enable the body to successfully haul and dump abrasive material without the body experiencing the otherwise excessive wear at its rearward portion of the body. Specifically, in addition to the design parameters required in modeling the body in keeping with the above-identified co-pending patent applications, the body 10 also requires (1) downwardly tilting the floor 20 of the body at an area rearward of the body's pivot axis, (2) foreshortening the end of the body, (3) flaring the sidewalls such that the distance between the opposing sidewalls increases from the front to the back of the body and (4) adding a tailgate to the foreshortened rear end of the body.

Using the angles of material repose (i.e., front, rear and sides) data obtained from the analysis of field haulage conditions, an approximate heap profile of the material to be hauled is generated utilizing the individual average values for the front, rear and side angles of material repose taken from the field data. Additionally, an initial dump body side height is established at the point where the side angle of material repose contacts the body side for the body 10 and or as set by mine operator parameters. The placement of the center of gravity of the approximate heap profile along the truck chassis 14 is then determined and compared with the optimal location along the chassis for the load center of gravity.

Figure 3:
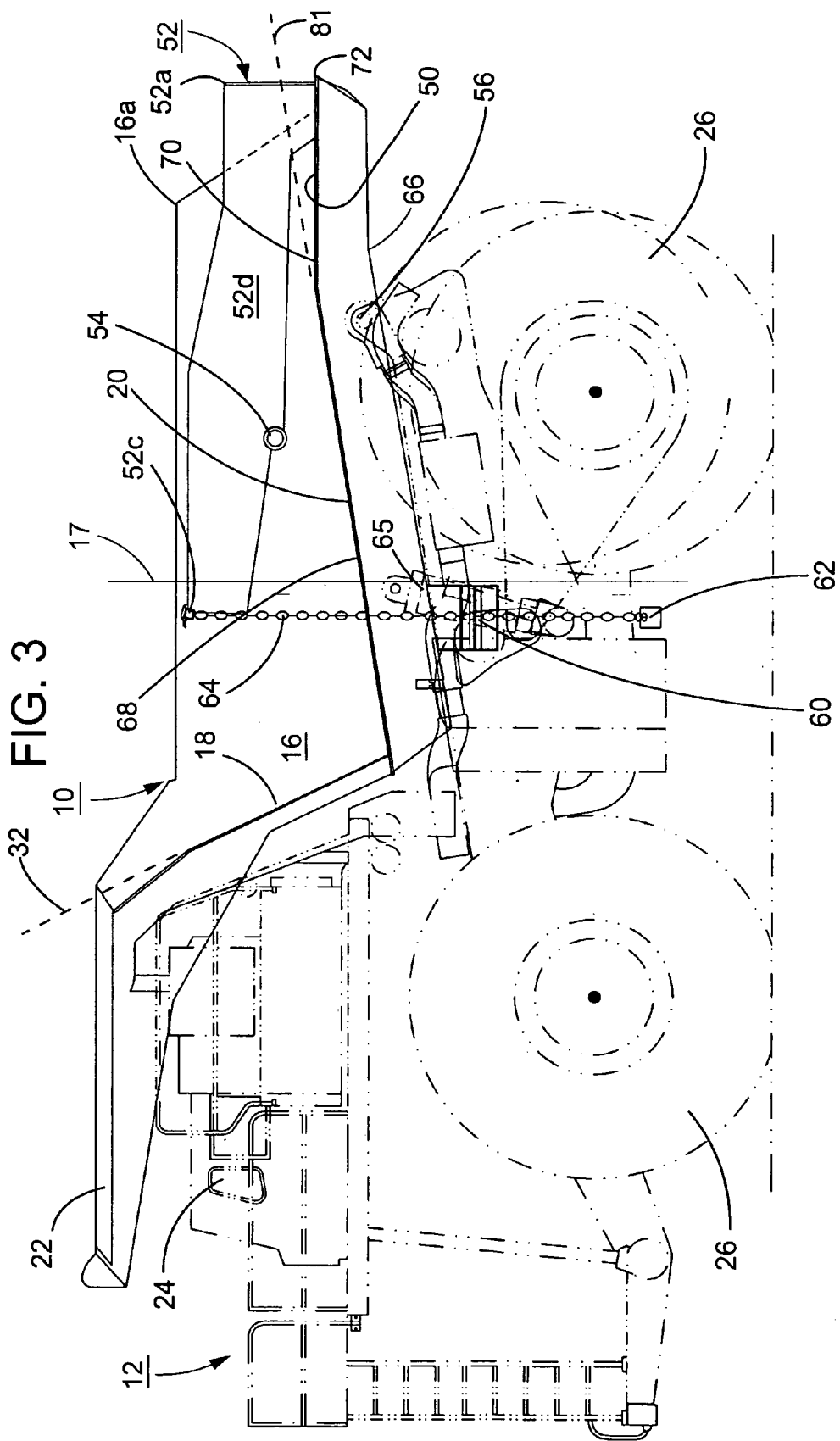
FIG. 3 is a side view of the off-highway haulage truck of FIG. 1.

Referring to FIG. 3, the angles of the floor lines 50 and 68, the lengths of the floor lines and the front slope line 32 and the height of the sidewalls 16 are adjusted so that through an iterative process, the center of gravity of the load is located as close as possible to the correct truck chassis 14 load center of gravity while maintaining the desired body volume as defined by the load model and the body physical parameters meets any operator imposed dimensional limitations. In adjusting the various physical parameters of the body 10, it is preferable to keep the center of gravity of the load as low as possible in order to provide the best truck chassis stability. Accordingly, in the iterative process used to locate the center of gravity of the load in the desired position, it is generally preferable to focus on adjusting the height of the sidewalls 16 and the length of the floor 20, versus rotating the angles of the floor. For example, lowering the height of the sidewalls 16 and lengthening the floor 20 moves the center of gravity rearward relative to the chassis 14 and raising the height of the sidewalls and shortening the floor moves the center of gravity forward relative to the chassis 14. Using the iterative process, the width of the body 10 may also be adjusted with the height of the sidewalls 16, length of the floor 20 and angle and height of the front slope 18 in order to minimize the overall load height profile. While overall loading height of the dump body influences the size of the loading equipment that is required, lower overall dump body loading heights improve truck stability and lessen the need for larger loading equipment. Lower overall dump body loading heights also necessarily allow the load material to be dropped into the dump body from a lower point, thereby minimizing the impact force of the load material on the dump body. Obviously, the wider the body 10, the lower the center of gravity. As a practical limit, however, the body 10 generally should not be significantly wider than the overall width of the rear axle measured from the outer edges of the rear tires 26 or as preset by the truck chassis manufacturer.

Based upon this approximate load profile and the data from field haulage conditions, a three-dimensional model 38 (e.g. shown in FIG. 2) of the load heap is developed which typically by experience will incorporate corner voids. To account for corner voids (corners of the body where no hauled material is located) in the three-dimensional modeled load profile 38, the transition areas between the sides and the front and the rear of the load are modeled based on a gradual incremental blending of the side angle of material repose 40 to the front and rear angles of repose 34, 36 (which may or may not be different). After the corner voids are so modeled, the modeled voids may then be compared to the information collected in the field and the corner voids may then be adjusted so as to as closely as possible match the modeled corner voids with the field-determined corner voids.

Figure 2:
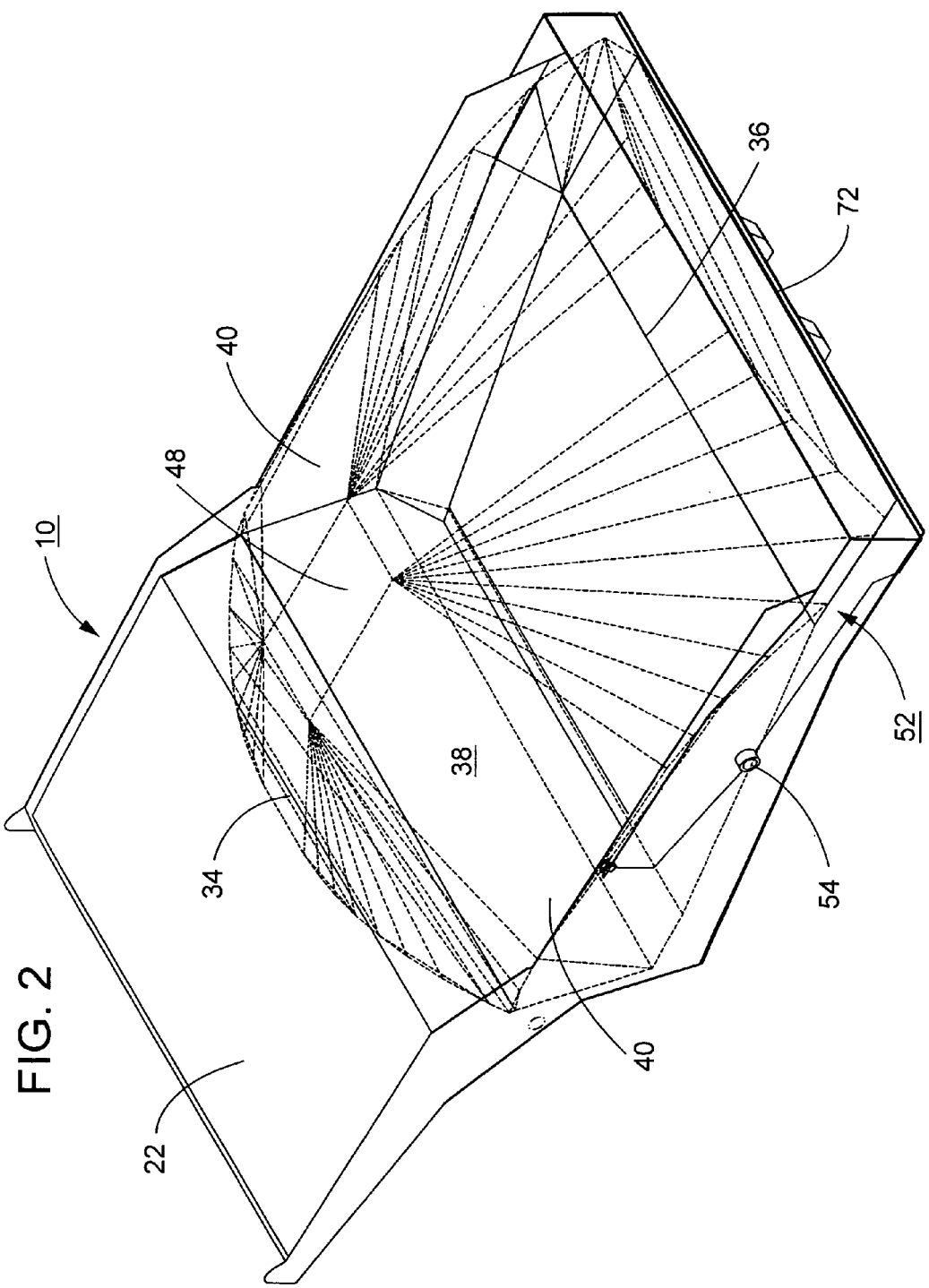
FIG. 2 is the perspective view of the body of FIG. 1 with the body shown in isolation and with a silhouetted image of a load carried by the body.

To this end, in one embodiment, the transitional areas between the front 34 and the sides 40, and the rear 36 of the three-dimensional load model 38 are divided into a number of equal segments as suggested by FIG. 2. In the particular embodiment of FIG. 2, the boundaries of the transition areas between the sides 40 and the front 34 and rear 36 portions of the three-dimensional load model 38 form 90° angles defined by the flat top or plateau 48 of the load model 38, with each of the transition areas being divided into nine equal 10° segments. In another embodiment of the invention, the load model 38 is conical in shape rather then a series of planar surfaces as illustrated in FIG. 2.

Each of the surfaces of the modeled load is extended using standard geometric principles until it intersects a portion of the dump body 10 such as the sidewalls 16, front slope 18, canopy 22 and tailgate 52 as shown in FIG. 2. Specifically, end points are established for each of these planar surfaces by using the values of the angles of material repose for each of the segments and the horizontal distance for each respective segment from the load plateau 48 which may be oval in shape to the perimeter of the dump body 10 to calculate the horizontal and vertical positions for the end points of the planes. Each surface is then extended to its respective end points. Next, any portion of the surfaces that extends beyond the boundaries of the dump body 10 is then "cut-off" or truncated at the point at which it intersects the dump body to define the corner edges of the three-dimensional load model 38 as shown in FIG. 2. The completed three-dimensional load heap profile 38 is shown in FIG. 2.

After the three-dimensional modeling of the material heap is completed, the center of gravity of the resulting three-dimensional load model 38 is determined. This center of gravity is then compared to the center of gravity location contemplated by the chassis design (reference line 17 in FIG. 3). If the center of gravity of the three-dimensional load model 38 is in close proximity to the center of gravity location contemplated by the chassis design then the design of the dump body 10 is complete. It is generally desirable to have the load center of gravity as close as is practical to the desired chassis location. While the distance will vary depending upon the relative length of the wheelbase of the truck, in one preferred embodiment the center of gravity will be considered sufficiently close to the desired location if it is within less than approximately one to two inches from the desired location dependent on the haul road profile the trucks will be operated on. Due to the inherent design characteristics of off-highway trucks (in an empty condition an inordinate amount of the net weight of the truck is carried on the front axle), in most circumstances, the center of gravity of the three-dimensional load profile should not be allowed to be positioned slightly rearward of the center of gravity location contemplated by the chassis design.

In the event that the center of gravity of the three-dimensional load model 38 is not close enough to the desired location, an iterative process generates a new three-dimensional profile of the heaped load based on the data collected from the field loading/haulage environment. Through adjustment of the parameters of the dump body (e.g., the dump body floor angle, floor length, side height and tailgate position and height), the center of gravity of this new three-dimensional heaped load profile is moved through the iterative process until it is in close proximity to the desired location. These steps being repeated in an iterative fashion as necessary until the location of the center of gravity of the three-dimensional load model is approximately coincident with the anticipated center of gravity contemplated by the design of the truck chassis 14.

The body illustrated in FIGS. 1-5 is preferably, but not necessarily designed using the foregoing approach of modeling the dimensions of the body around a three-dimensional model of the load. Regardless of the technique employed to dimension the body, it includes features that enable it to reduce the amount of wear at the rearward portion of the body so that the body is able to successfully over extended use haul and dump very abrasive material. In the body illustrated in FIGS. 1-5, the material has a greater tendency to tumble over the rearward area of the floor and thus is more likely to break up as it is dumped than in the prior art bodies that often dumped cohesive material as a "loaf." Also, by encouraging the material to tumble, its abrasive action on the floor is lessened. The abrasive action of the material as it is dumped is further lessened with respect to conventional body floors because the pressure holding the material to the floor is reduced by the increased angle of inclination downward in the rearward area of the floor. By shortening the rearward area of the floor with the addition of a tailgate, there is less body floor and sidewall area for the material to abrade. Moreover, the shortening of the body allows for better ground clearance when tilting the body to dump a load. It also enables the body to better clear a berm when it is dumping. The longer floors of conventional bodies tend to be exposed to grinding action by the material because the greatest amount of material flows over the most rearward area of the floor. Forward areas of the floor 20 are exposed to less abrasive action because the material flows out of the body from front to back. This action naturally results in more abrasion at the rear section of the floor 20 than at the front section.

The rearward area 50 of the floor 20 is truncated with respect to conventional bodies that extend the body's floor to inhibit material spillage. When dumping a load of abrasive material from the body 10, the material flows the most over the rearward area 50 of the floor 20, thereby causing the most wear to that portion of the floor. Hence, foreshortening and lowering of the rearward area 50 of the floor 20 results in a reduced surface area in contact with the abrasive material, thereby reducing the wear of the floor 20.

Without compensating for the shortening of the floor length, the load center of gravity is shifted forward and the volumetric loading capacity of the body 10 is reduced, which may result in the vehicle operating under its weight capacity when fully loaded. Operating these off-highway vehicles under their capacities increases the operating costs. Additionally, foreshortening of the rearward area 50 tends to increase the frequency of material spillage, which, as stated above, significantly increases haulage costs by reducing the useful life of the tires 26. In keeping with the invention, the body 10 incorporates a tailgate 52 to provide a back wall of the body that allows for haulage of loads of increased volume and preferable at the rated payload volume for the vehicle 12. The tailgate also inhibits spillage in a manner that is more effective than the elongated floor of the conventional, open ended off-highway trucks.

The addition of a tailgate may raise the elevation of the rear of the body. But by providing a smaller angle of inclination at the rearward area of the body, the elevation of the top of the tailgate is lowered, resulting in the top of the tailgate sitting on the rear edge of the body floor at an elevation no higher than the extreme rear edge of a standard "V-Shaped" or "duck tailed" body.

As seen in FIGS. 1-3 and 5, the tailgate 52 is pivotally attached to the exterior of the sidewalls 16 in order to rotate between the closed and opened positions corresponding to pivotal rotation of the body 10. Referring to FIG. 3, the tailgate pivot 54 is located forward (i.e., more proximate to the cab 24) of the body-to-chassis pivot 56. The forward location of the tailgate pivot 54 in relation to the body-tochassis pivot 56 works to mechanically rotate the tailgate 52 in a counterclockwise direction (FIG. 3) as the body rotates clockwise about the body-to-chassis pivot to its fully dumped position shown in FIG. 5.

A chain 64 secured to the forward end 52c of each of the two sides 52d of the tailgate 52 maintains the end at a fixed position with respect the vehicle chassis 14. As the body 10 is lifted by the action of hydraulic cylinders 65 in a conventional manner the pivot point 54 of the tailgate 52 moves and is rotated upwardly and rearwardly, causing the tailgate to rotate about its pivot point 54. When the body 10 is in its fully dumped and tilted position as shown in FIG. 5, the tailgate 52 is rotated into an opened position. As the body 10 is lowered, the tailgate 52 rotates in a clockwise direction (as viewed in the figures) as the pivot 54 of the tailgate rotates forward and is lowered with the lowering of the body.

To effectuate the rotation of the tailgate 52, the chain 64 mechanically connects the tailgate 52 and the chassis 14 at points 52c of the tailgate and 62 of the chassis 14. Details of the connection are set forth in applicant's issued U.S. Pat. No. 4,678,235. The chain 64 is threaded through a roller assembly 60 secured to a lower edge 66 of the sidewall 16 of the body 10. The roller assembly 60 biases the chain 64 away from the edge 66 of the body 10. Alternatively, the chains 64 may be secured to extensions of the chassis or outriggers that allow each of the chains 64 to extend substantially straight down from its attachment at the tailgate to an attachment at the chassis. A still further alternative is to rotate the tailgate with a hydraulic cylinder and a control system for it.

Additionally, to further reduce the wear on the floor at the rearward portion 50 of the body 10, the rearward portion 50 is angled downwardly at a different inclination from the forward portion or area 68 of the floor 20. In general, in its lowered position as illustrated in FIG. 3, the rearward section 50 of the floor 20 is at an inclination that is angled downwardly toward the ground with respect to the inclination of the floor section 68. By angling the rearward section downwardly toward the ground with respect to the inclination of the floor section 68, material flowing over the floor as the body is rotated into its dump position tends to shoot over the rearward section 50 resulting in less wear to this section than if that section were at the same inclination as the section 68 or at a higher angle of inclination, duck tailed (i.e., angled upwardly toward the sky). As best seen in the schematic diagram of FIG. 5a, by angling the floor 20 downwardly at its rearward portion 50, there is less of a frictional force created by the weight of dumping material as the body is tilted to dump the load. Because the floor is at a greater incline in the rearward area, more of the weight is translated to a force parallel to the floor section 68, resulting in a rolling tumbling of the material over section 50, which tends to reduce the friction and abrasion on floor section 50. In short, the greater downward angle of floor inclination reduces the frictional force of the material against the floor 50 and increases the forces that tend to roll the material, which rolling tumbling motion further reduces the abrasive action of the material.

Figure 5A:
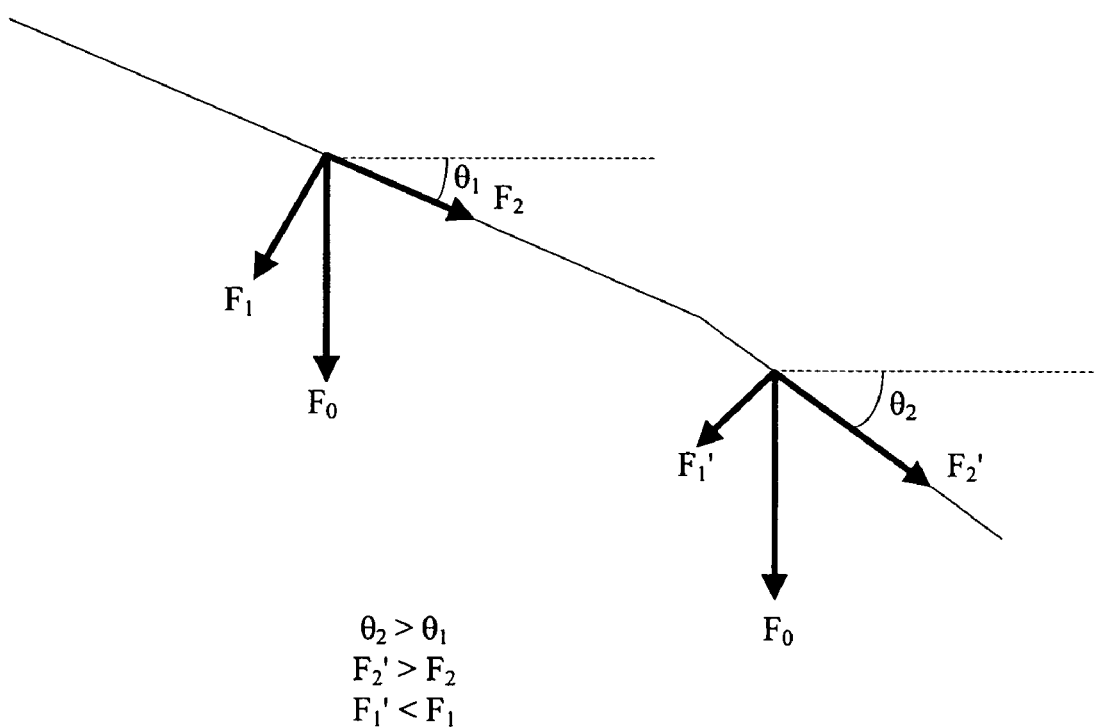
FIG. 5a is a schematic diagram of exemplary forces on the floor of the body fully tilted for dumping a load, showing how the same force $F_0$ at two areas of the floor having different inclinations results in different forces into the floor and parallel to it.

In FIG. 5a, the floor 20 is shown schematically in the fully tilted position of the body 10 illustrated in FIG. 5. The two force vector diagrams demonstrate the different distribution of the same force $F_0$ at the two different areas of the floor 50 and 68. Because of the greater angle of inclination, the force $F_2$ in line with the floor 20 or parallel with the floor increases with the greater inclination of the floor area 50. Correspondingly, the forces $F_1$ and $F_1$ are the friction creating forces and $F_1$ decreases with the increased inclination of the floor 20 in area 50. Once the dumped material reaches the rearward portion 50 of the floor 20, the change in the angle from $\theta_1$ to $\theta_2$ of floor inclination reduces the frictional force $F_2$ to $F_2$, causing the material to flow more freely and with less abrasion on the rear portion 50 of the floor 20 than if the rear portion maintain the same inclination as the forward area 68 of the floor 20.

There may be several breakpoints along the length of the floor 20 where the inclination of the floor changes. In the illustrated embodiment of the open top body 10, the floor 20 has a single breakpoint transitioning the inclination of the floor from one area 68 having a first angle of inclination (with respect to a reference such as a horizontal plane) to another area 50 having a second angle of inclination (with respect to the same reference). Material 80 in FIG. 5 flows from the body 10 and over a point 70 where the floor 20 breaks away from the plane of the one area 68 to the plane of the other area 50 with a greater angle of inclination. As the material 80 moves over the breakpoint, it tends to tumble as the force $F_2$ increases to $F_2$. By increasing the tumbling or rolling action of the material, the frictional abrasion on the floor surface 50 is reduced compared to what might otherwise occur if the material slides along the surface. Furthermore, as the material flows out the rear of the body 10, its momentum tends to give it a trajectory guided by the forward area 68 of the floor 20. The trajectory of the material and its momentum has a tendency for the material falling away from the floor in the rearward area 50 since from the viewpoint of the material with its trajectory and momentum, the floor appears to move away from the material as it passes over the breakpoint. If its momentum is great enough, the material 80 overshoots the rearward portion 50 of the floor during dumping of the load. This overshooting of material effect tends to further reduce overall wear on the body 10 by minimizing the material contact on the rearward floor portion 50 from the dumped abrasive material 80.

Referring again to FIG. 3, because the rearward portion 50 is downwardly inclined in relation to the forward portion 68 of the floor 20, the top edge 52a of the tailgate 52 typically remains below the top edge 16a of the sidewall 16. The height of the tailgate is preferably maintained at an elevation that is equal to or less than the elevation of the rear edge of the floor for conventional bodies without tailgates, which is shown as a dashed line 81. By maintaining the height of the tailgate to this elevation or less, the loading equipment servicing the vehicle 12 is not required to adjust or modify its loading process. In this regard, the loading shovel (not shown) is able to maintain the same vertical elevation for positioning the load in the body 10 and releasing it into the body almost as if there was no tailgate 52 on the body 10.

By shortening the body's floor 20, at full tilt of the body 10, the ground clearance 74 of the rear of the body 10 to ground is substantially increased, as suggested by FIG. 5. By increasing the ground clearance, there is less damage to the rear body edge 72 from dumping the body 10 into material 80 already on the ground. Furthermore, where material 80 is being dumped over an embankment, a "dump berm" that is at least as high as half the height of the largest tire operating in the haulage vehicle fleet as generally required by government regulation in order to avoid accidentally backing the truck over the embankment. With conventional "V-shaped" or "duck tailed" bodies, this safety "dump berm" is continually being dumped into, destroying the dump berm and requiring it to be continually maintained with a piece of dozing equipment. With a body 10 whose floor length is shortened, the dumping of the body 10 into the safety dump berm is either stopped or minimized.

Figure 4:
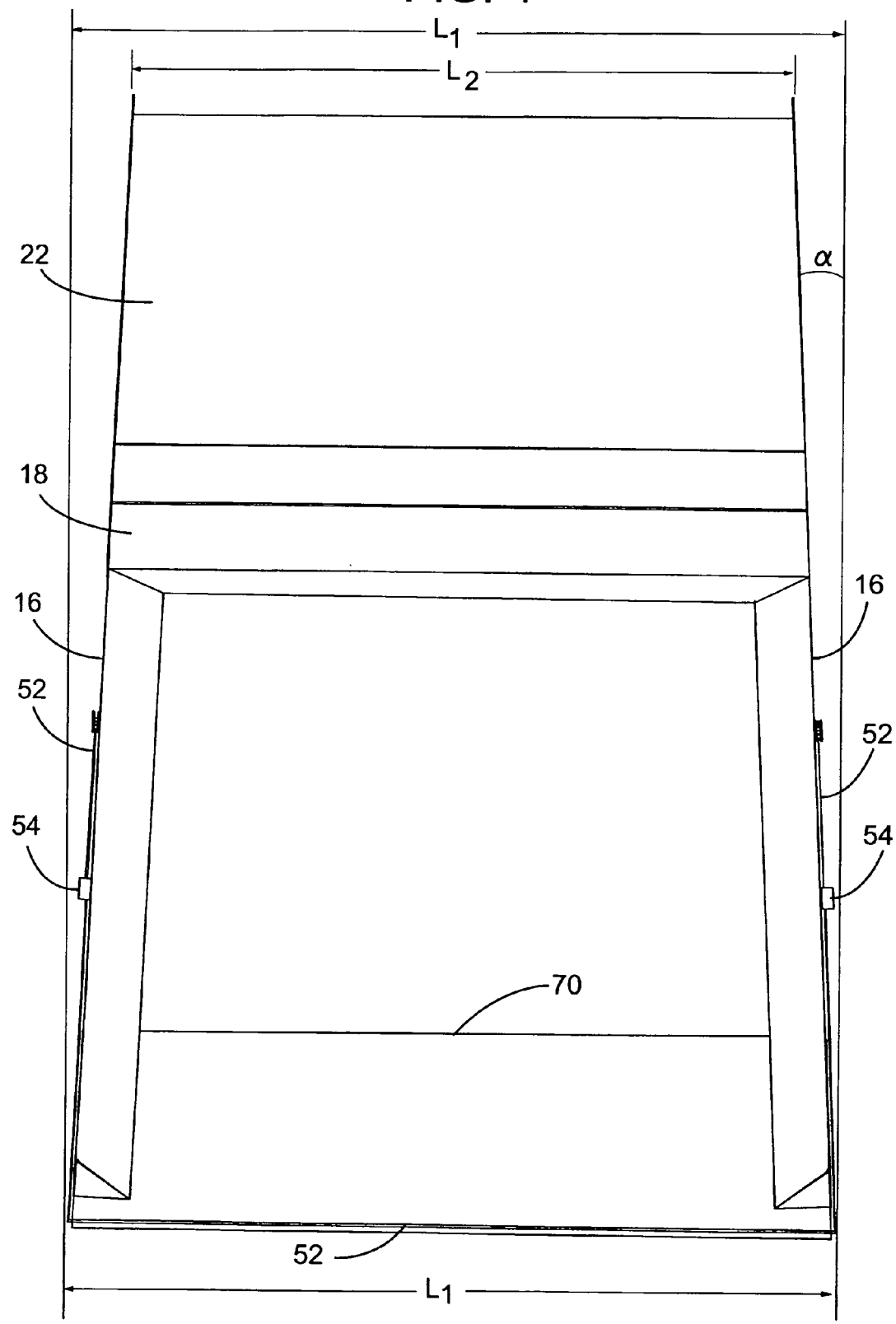
FIG. 4 is top view of the body taken along the line 4-4 in FIG. 1, illustrating the outward flaring of the sidewalls of the body from front to back.

To still further reduce the wear of the body 10 from hauling and dumping abrasive materials, the sidewalls 16 of the body are flared outwardly from front to the back of the body, as best shown in FIG. 4. The flared sidewalls 16 relieve the pressure otherwise placed on the sidewalls by the flowing material, which reduces the amount of friction experienced by the sidewalls 16. With the sides and bottom of the load not fully supported as the material 80 is dumped from the body 10, the load tends to break up and more evenly distribute across the floor 20, which further decreases the frictional forces and resulting abrasion on the floor and sidewalls and also further encouraging a tumbling or rolling action of the material.

The sidewalls 16 are tapered at an angle $\alpha$ with respect parallel lines separated by a distance $L_1$ in FIG. 4. The angle $\alpha$ is approximately ½ degree or greater. Over the length of the body 10, the tapering of the angle $\alpha$ widens the body 10 from a width $L_2$ at the front of the body at the top of FIG. 4 to a width $L_1$ at the rear of the body at the bottom of the figure.

To the extent not otherwise expressively stated elsewhere in this document, all patent applications and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

A preferred embodiment of this invention is described and illustrated herein, including the best mode known to the inventor for carrying out the invention. Variations of this preferred embodiment may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An open top body of an off-highway haulage vehicle for hauling abrasive material, the body comprising:
    a floor comprising at least two sections with a first forward section of the floor at one inclination and a second rearward section inclined at a different inclination angled more downwardly toward a ground surface than the inclination of the first section,
    opposing sidewalls extending vertically from the floor and horizontally from a front wall toward a rear of the floor such that the distance between the opposing sidewalls increases from the front wall to the rear of the floor; and
    a tailgate pivotally attached to the sidewalls for rotation between closed and opened positions.

2. The open top body of claim 1 wherein the first section of the floor extends from the front wall to an area rearward of a vertical plane passing through a pivot and the second section extends from an end of the first section to the rear of the floor.

3. The open top body of claim 1 wherein the tailgate is pivotally attached to the sidewalls at a location forward of a pivot for rotating the floor and the tailgate is mechanically connected to the chassis of the vehicle such that rotation of the floor about the pivot cause the tailgate to rotate between the closed and opened positions.

4. The open top body of claim 2 wherein the second section of the floor supports the tailgate.

5. The open top body of claim 3 wherein the tailgate includes side arms that are pivotally supported on the sidewalls of the body with one end of each arm joined to a rear wall of the tailgate and an opposing end of each arm mechanically connected to the chassis of the vehicle.

6. The open top body of claim 1 including a pivot for rotating the floor about a chassis of the vehicle in order to cause the abrasive material being hauled to be dumped.

7. A method of dumping material from an open top body having opposing sidewalls extending vertically from a floor of the body and extending horizontally from a front wall of the body toward a rear of the floor such that the distance between the opposing sidewalls increases from the front wall to the rear of the floor, the method comprising:
    tilting the body about an axis of rotation;
    rotating a tailgate to an open position in response to the tilting of the body;
    supporting material carried in the body at first and second angles of inclination along the floor of the body as the body is tilted such that the material flows from an area of the floor at a first angle to an area of the floor at the second angle of inclination, where the second angle is greater than the first angle such that the second angle inclines the floor more toward a ground surface than does the first angle; and
    laterally supporting the material carried by the body as it flows from the body as it is tilted such that the opposing sidewalls flare away from one another so as to relieve pressure of the material bearing against the sidewalls.

8. The method of claim 7 further comprising rotating the tailgate about an axis of rotation mounted to a sidewall of the open top body.

* * * * *